United States Patent [19]
Dyer

[11] Patent Number: 5,921,580
[45] Date of Patent: Jul. 13, 1999

[54] COUPLING ASSEMBLY FOR FLUID CIRCUIT

[76] Inventor: Richard D. Dyer, 18240 N. 34th Dr., Phoenix, Ariz. 85023

[21] Appl. No.: 08/834,237

[22] Filed: Apr. 15, 1997

Related U.S. Application Data

[63] Continuation-in-part of application No. 29/057,886, Aug. 2, 1996., abandoned

[51] Int. Cl.[6] .................................................... F16L 19/00
[52] U.S. Cl. .............................................. 283/32; 285/89
[58] Field of Search .................................. 285/31, 32, 5, 285/89

[56] References Cited

U.S. PATENT DOCUMENTS

| | | | |
|---|---|---|---|
| 141,893 | 8/1873 | Scofield | 285/32 |
| 661,377 | 11/1900 | Martin et al. | 285/89 |
| 844,354 | 2/1907 | Hawkinson | 285/32 |
| 1,301,244 | 4/1919 | Ford | 285/32 |
| 1,308,853 | 7/1919 | McVoy | 285/32 |
| 1,861,314 | 5/1932 | McAndrew | 285/39 |
| 2,343,235 | 2/1944 | Bashark | 285/89 |

FOREIGN PATENT DOCUMENTS

| | | | |
|---|---|---|---|
| 534920 | 12/1956 | Canada | 285/31 |

*Primary Examiner*—Eric K. Nicholson
*Attorney, Agent, or Firm*—Gregory J. Nelson

[57] ABSTRACT

A coupling assembly for a fluid circuit such as an irrigation system which facilitates removal of a valve or other component. The assembly includes a riser which is threaded at opposite ends with one end of the riser being engageable in the valve and the opposite end engageable in the internally threaded end of an adaptor. The opposite end of the adaptor is secured to a line in the fluid circuit. The coupling assembly may be disassembled by rotating the riser to retract it with the adaptor causing it to disengage from the valve or other component so the component may be removed and replaced with ease. The fluid circuit is re-established by oppositely rotating the riser to cause it to extend from the adaptor to bring it into fluid tight engagement with the valve or other component.

4 Claims, 1 Drawing Sheet

COUPLING ASSEMBLY FOR FLUID CIRCUIT

REFERENCE TO RELATED APPLICATION

This application is a continuation-in-part of application Ser. No. 029/057,886, filed on Aug. 2, 1996 now abandoned.

BACKGROUND OF THE INVENTION

Field of the Invention

The present invention relates to a coupling assembly and more particularly relates to a coupling assembly for connecting a plumbing component such as a valve to a service and supply line so that the valve may be easily installed and removed for replacement or repair.

Irrigation systems, particularly subterranean irrigation systems, generally provide water through a service line connected to a control valve which valve may be manually or automatically operated. The control valve outlet is connected to a supply line which delivers fluid to a source of use such as water to sprinklers in a sprinkling system. Generally the control valve is connected to the supply and service lines by means of various types of pipe connectors such as unions which facilitate removal and installation of the valve. These type connectors facilitate installation and removal of the valve but generally are a slip or non-threaded type fitting. These prior art connections generally lack stability and many times their use will cause damage to the pipes which inherently results in additional labor and material expense.

SUMMARY OF THE INVENTION

Briefly, the present invention relates to a coupling assembly for use in a fluid conduit such as an irrigation system. The coupling assembly of the present invention simplifies the installation and removal of components such as irrigation valves and also significantly reduces labor costs. The coupling assembly of the present invention includes an adaptor which is configured at one end so that it attaches to the existing service or supply line. For example, the adaptor may define an internal cavity which is adapted to receive the existing line such as a PVC supply line which is glued in place at one end of the adaptor. The opposite end of the adaptor is threaded and receives a riser. The riser has threads at opposite ends and one end may be threadingly engaged within the adaptor having a thread length which exceeds the normal depth of engagement of the adaptor. The opposite end of the riser is threaded or otherwise configured to be attached to the plumbing component such as the control valve. The coupling assembly may be installed either at the upstream or downstream side of a valve or other component. A locking device, such as a lock nut, is in threaded engagement with the riser and is tightened in place against the adaptor. An O-ring seal is interposed between the adaptor and riser.

When removal of the plumbing component such as removal of the valve is required, the riser may be manually rotated so that it retracts within the adaptor. Loosening of the lock nut occurs to allow retraction of the riser. Retraction of the riser disengages the opposite end of the riser from the plumbing component such as the control valve providing sufficient clearance so that the control valve may be removed. Once the control valve or other plumbing component is replaced, the riser is rotated in the opposite direction to cause it to extend from the adaptor sufficiently to bring it into engagement with the plumbing component such as the female threaded outlet of the valve. Once the riser is in engagement with the valve, it remains in engagement with the adaptor completing the fluid circuit. The lock nut may then be tightened down to secure the riser and adaptor in place.

The above and other objects and advantages of the present invention will be more fully understood from the following description, claims and drawings in which:

Figure 1:
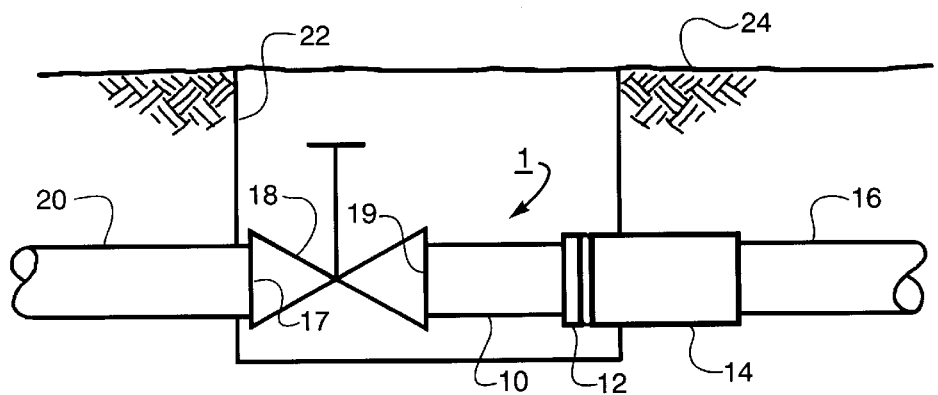
FIG. 1 shows a representative installation of a plumbing system using the coupling assembly of the present invention.

The coupling of the present invention is generally designated by the numeral 1 and may be used in conjunction with various plumbing components but typically would be used in an irrigation system such as that shown in FIG. 1. In FIG. 1, the irrigation system is a subterranean irrigation system buried below grade 24 and has a line or lateral 20 from a service which supplies water to a control valve 18. The control valve 18 may be manually or automatically operated and is conventionally contained within a subterranean control box 22. The coupling assembly of the present invention, as has been indicated, is generally designated by the numeral 1 and is secured to the discharge side of the valve 18 and is interposed between the valve 18 and a service or supply line 16.

Figure 2:
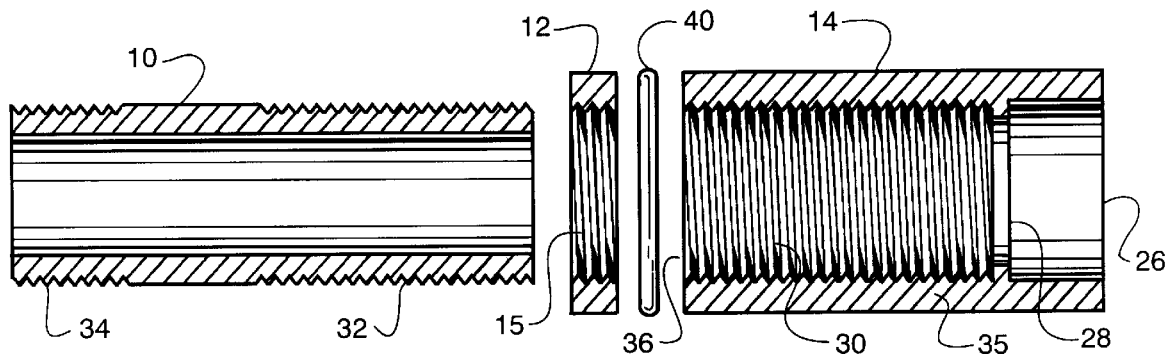
FIG. 2 is an exploded view illustrating the components of the coupling assembly of the present invention.
Figure 3:
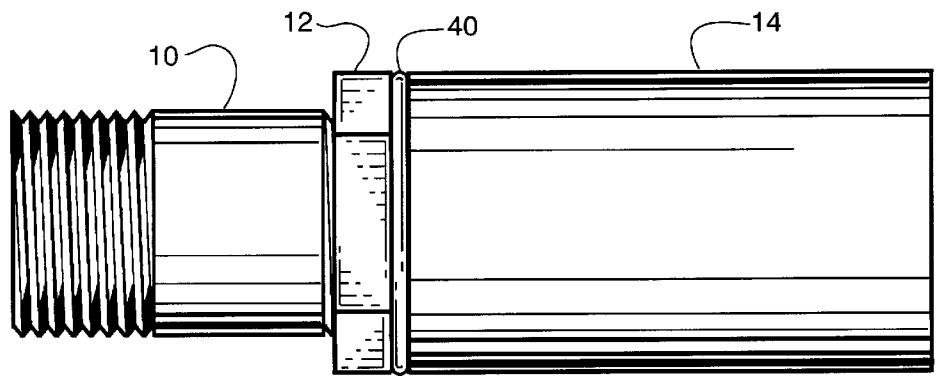
FIG. 3 is a view showing the components of the coupling assembly of the present invention in an assembled position.

The components of the coupling assembly are best seen in FIGS. 2 and 3 and include a riser 10, a lock nut 12, and an adaptor 14. Typically, the control valve 18 is internally threaded at discharge or outlet side 19 and inlet side 17. Supply line 20 may be metal or plastic and is typically plastic such as polyvinyl chloride (PVC).

Accordingly, the coupling assembly includes adaptor 14 which has an elongate tubular body 35 having a first end 36 and a second end 26. The coupling assembly 1 may be placed at the inlet or the outlet side of the valve or other plumbing fixture. Accordingly, end 26 defines a blind bore which receives the end of service line 16. Bore 36 may also be internally threaded. If metal piping is used, generally end 26 would be threaded. If plastic pipe is used, typically end 26 is not threaded and pipe 20 is secured in the end by use of a suitable adhesive. An internal flange 28 provides a stop to limit the engagement of the end of pipe 16 within the adaptor.

The opposite end 36 of the adaptor 14 is internally threaded at 30 and receives the end 32 of riser 10. End 32 of the riser is provided with external threads which extend longitudinally on the outer surface of the riser an axial distance corresponding approximately to the depth of threads 30 within the adaptor 14. The opposite end of riser 10 is threaded at 34 a shorter axial distance. Threads 34 are selected so as to be engageable within the discharge end 19 of the valve or plumbing fixture 18. A lock nut 12 has interior threads 15 in engagement with male threads on the end 32 of the riser 10. O-ring 40 is interposed between the lock nut 12 and the adaptor.

Referring to FIGS. 1 and 3, the coupling assembly in FIG. 1 is shown installed between the discharge end 19 of valve 18 and the supply or service line 16. In assembling the irrigation circuit, lines 16 and 20 are installed and cut to the desired length leaving room for the valve 18 and the adaptor assembly 1. As shown, the coupling assembly 1 is preferably installed in a suitable control box 22. The adaptor 14 is installed by inserting the bore at end 26 over the end of pipe 16. As indicated above, the adaptor may be in threaded engagement with pipe 16 or secured by adhesive. Adhesive works well as the adaptor becomes fixed and resists rotation. Once this is accomplished, the riser 10 is prepared for installation by placing the lock nut 12 and O-ring 40 in engagement with the exterior of end 32 and turning the lock nut so that it is positioned at an intermediate location along the riser, as shown in FIG. 3. The threaded end 32 of the riser may then be engaged in the end 36 of the adaptor and turned until the riser is fully or substantially fully engaged or retracted within the adaptor 14. With the riser 10 retracted within the adaptor 14, there is adequate room for insertion of the valve 18 or other component. The valve 18 may be attached to the line 20 by placing the inlet end 17 of the valve 18 in engagement with the distal end of line 20 and turning the valve until it is in the proper position as shown in FIG. 1. Once this is accomplished, the riser 14 may be brought into engagement with the outlet end 19 of valve 18 by rotating the riser, bringing the threads at end 34 into engagement with the discharge end of the control valve and continuing to turn the riser until a fluid-tight circuit is completed. The circuit is completed by turning the lock nut 12 to bring it into tightened engagement with the end 32 of the adaptor. The O-ring 40 will assist in providing a fluid-tight connection between the riser and the adaptor. In this position, the circuit is completed.

Subsequently, if it becomes necessary to remove the valve, this can be easily accomplished without cutting any of the lines. The lock nut 12 is loosened in a direction to move it away from the end of the adaptor. When the lock nut has been loosened, the riser 10 can be turned in a direction to cause it to retract within the adaptor which also causes it to disengage from the discharge end 19 of the valve 18. When the riser is disengaged from the valve, the valve 18 may be then removed by turning it in a direction to disengage it from the end of line 20. The valve or other component may then be replaced and the assembly returned to a fluid-tight condition by rotating the riser 10 in a direction to bring it into engagement with the threads at the end of the replacement valve or component. The lock nut 12 can then be returned to its tightened position with the O-ring interposed between the lock nut and the adaptor.

Accordingly, it will be seen that the present invention provides a novel and unique coupling assembly which makes servicing and removal of plumbing components, particularly valves in underground sprinkler applications, simpler, reducing labor and eliminating cutting of lines.

While the principles of the invention have been made clear in the illustrative embodiments set forth above, it will be obvious to those skilled in the art to make various modifications to the structure, arrangement, proportion, elements, materials and components used in the practice of the invention. To the extent that these various modifications do not depart from the spirit and scope of the appended claims, they are intended to be encompassed therein.

I claim:

1. A coupling assembly for a fluid delivery system including a plumbing component and a conduit having an end spaced apart from the plumbing component to allow removal of the component, said coupling assembly comprising:
   (a) an axial riser having opposite first and second ends, said first end of said riser having male threads engageable with the plumbing component and the second end of said riser having male threads, the axial thread length of the threads at the second end of the riser being greater than the axial thread length at the first end;
   (b) an axial adaptor having a first end having female threads adapted to be engageable with the male threads at the second end of the said riser, the female threads at said first end of the adaptor being of a length approximately equal to the length of the threads at the second end of the riser whereby the riser may be retracted with respect to the said adaptor a distance at least corresponding to the thread length of the threads at the second end of said riser or axially extended with respect to said adaptor, said adaptor having a second end defining a bore secured to the end of said conduit;
   (c) a stop within the adaptor positioned between said threads at the first end of the adaptor and said bore; and
   (d) a lock nut in threaded engagement with the second end of the riser and axially positionable therealong to engage the first end of said adaptor when said coupling is interposed between said conduit and said plumbing component.

2. The coupling assembly of claim 1 further including an O-ring interposed between said lock nut and said adaptor.

3. The coupling assembly of claim 1 wherein said riser and adaptor are plastic.

4. The coupling assembly of claim 3 wherein said second end of said adaptor defines a blind bore which receives the end of the conduit.

* * * * *